Figure 1:
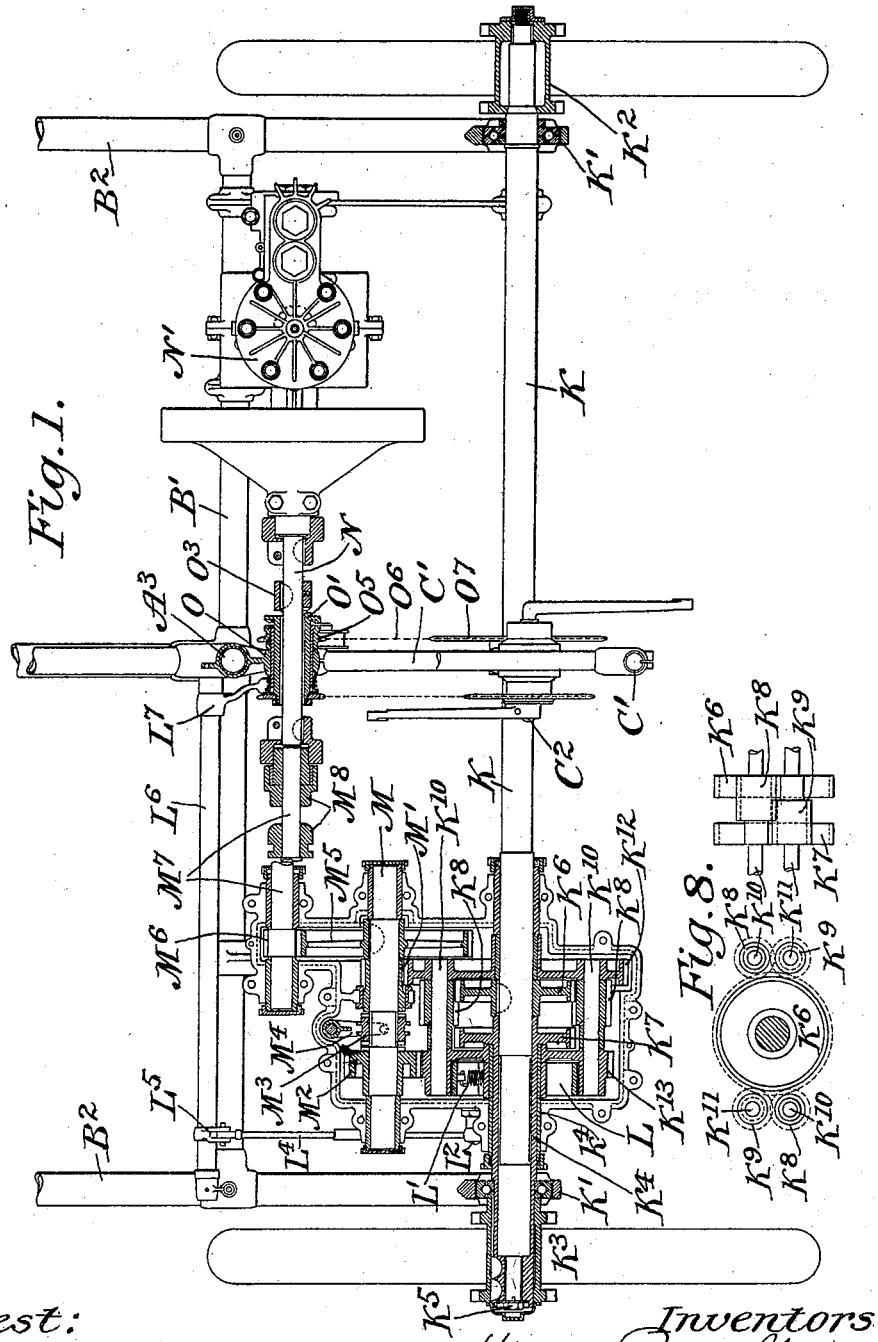

No. 621,532. Patented Mar. 21, 1899.
H. P. MAXIM, H. M. POPE & H. W. ALDEN.
DRIVING MECHANISM FOR VEHICLES.
(Application filed July 26, 1898.)
(No Model.) 3 Sheets—Sheet 1.

No. 621,532. Patented Mar. 21, 1899.
H. P. MAXIM, H. M. POPE & H. W. ALDEN.
DRIVING MECHANISM FOR VEHICLES.
(Application filed July 26, 1898.)
(No Model.) 3 Sheets—Sheet 2.

No. 621,532. Patented Mar. 21, 1899.
H. P. MAXIM, H. M. POPE & H. W. ALDEN.
DRIVING MECHANISM FOR VEHICLES.
(Application filed July 26, 1898.)
(No Model.) 3 Sheets—Sheet 3.
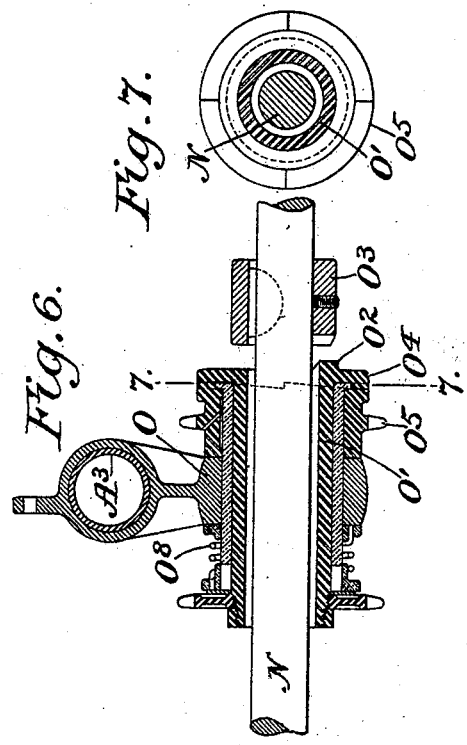
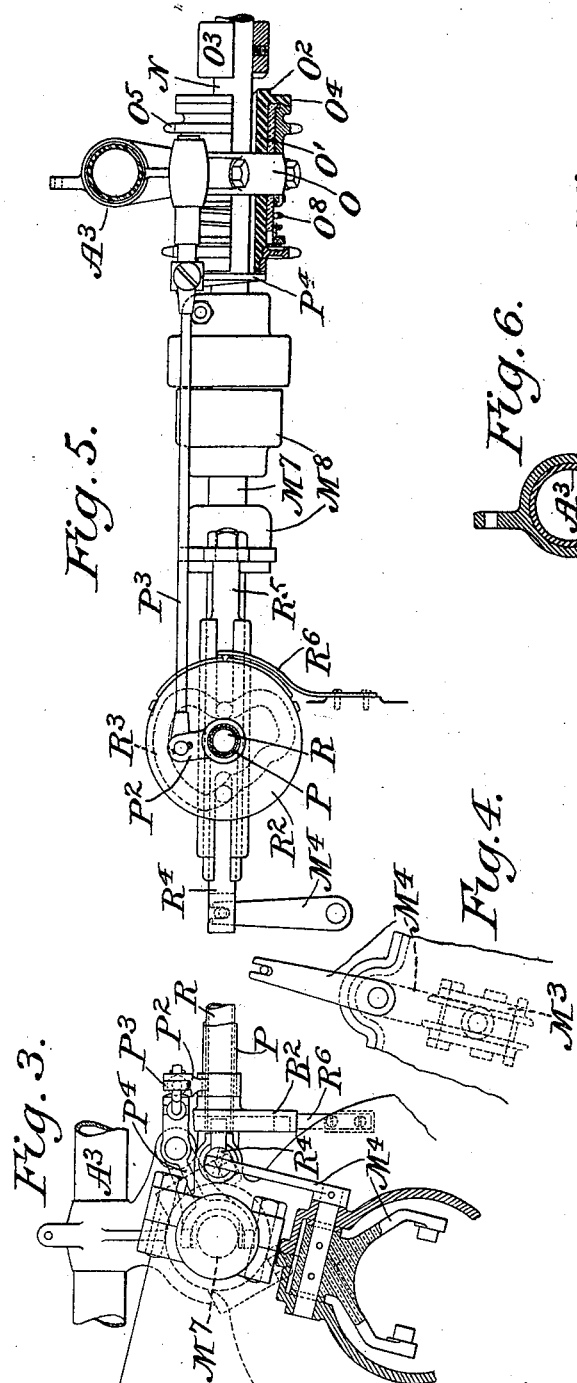
Inventors.
Hiram Percy Maxim
Harry M. Pope and Herbert W. Alden
by Redding, Kiddle & Greeley
Attys.
Attest:
A. N. Jesbera.
E. M. Taylor.

UNITED STATES PATENT OFFICE.

HIRAM PERCY MAXIM, HARRY M. POPE, AND HERBERT W. ALDEN, OF HARTFORD, CONNECTICUT.

DRIVING MECHANISM FOR VEHICLES.

SPECIFICATION forming part of Letters Patent No. 621,532, dated March 21, 1899.

Application filed July 26, 1898. Serial No. 686,914. (No model.)

*To all whom it may concern:*

Be it known that we, HIRAM PERCY MAXIM, HARRY M. POPE, and HERBERT W. ALDEN, citizens of the United States, residing in the city and county of Hartford, State of Connecticut, have invented certain new and useful Improvements in Driving Mechanism for Vehicles, of which the following is a specification, reference being had to the accompanying drawings, forming a part thereof.

This invention relates to the devices for transmitting power from the source or sources of power to the driven wheels of a vehicle, more especially of a vehicle which is wholly or in part of the general character of motor or automobile vehicles. It is not concerned with the character of the source of power, except so far as a motor of some sort may be combined with means of propulsion by hand or foot, but has for its object to improve the means for regulating and controlling the application of power derived from a motor and for starting up the motor or the vehicle, and incidentally to these main objects to improve the construction of vehicles in other particulars, as will be pointed out more fully hereinafter.

In vehicles of the class to which the invention more especially relates and in which provision is made for propulsion either by a motor or by a person mounted on the vehicle, or by both in conjunction, it has generally been necessary when the rider desires to propel the vehicle without the aid of the motor, as in starting up, to turn over the motor as well as to propel the vehicle, and in vehicles equipped with motors which require to be turned over one or more times before they are started it has generally been necessary for the rider to propel the vehicle as well as to turn the motor over. In both of these cases power is unnecessarily consumed; but by the present invention it has been sought to make it possible for the rider to start the vehicle without turning over the motor or to turn over the motor without starting the vehicle, while at the same time it shall remain always possible for the rider to use his strength whenever necessary to assist the motor after it has been started and to regulate and control the motor and to enable these results to be accomplished with mechanism which is not excessively complicated or heavy, but is easily manipulated by the rider under all circumstances.

The invention is illustrated in the accompanying drawings as applied to a motor-vehicle which is equipped with an explosive-engine and with means whereby the feet of a rider may be used to start the vehicle or to start the motor or to aid the motor; but except as may be pointed out in the claims hereinafter the invention is not to be regarded as limited to use with such a motor or such means for using the strength of the rider.

Figure 2:
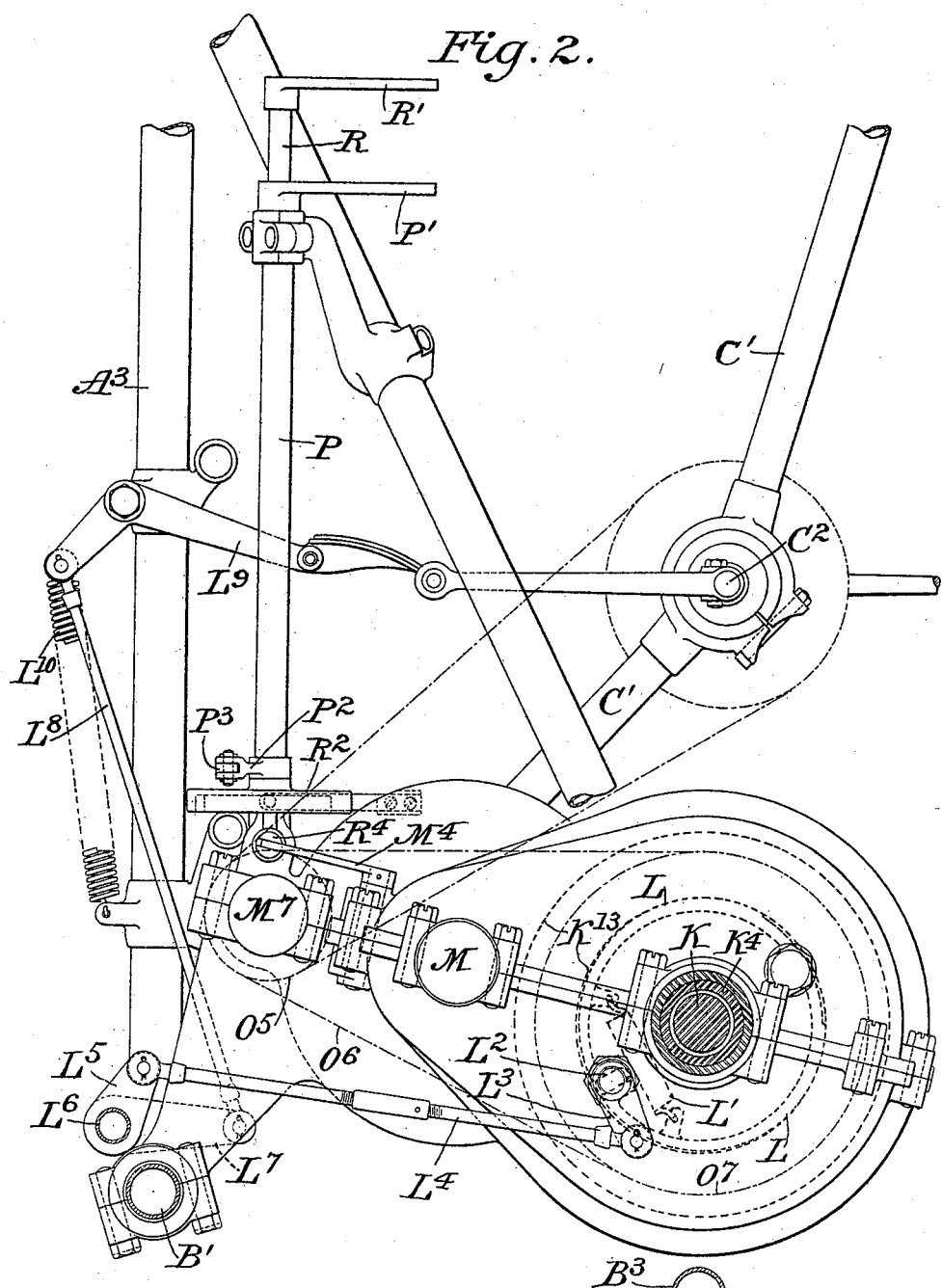

In the drawings, Figure 1 is a view partly in plan and partly in horizontal section on different planes, showing enough of a motor-vehicle with the invention applied thereto to enable the invention to be understood. Fig. 2 is a detail view in elevation with some parts in section of a portion of the driving mechanism shown in Fig. 1, the scale being larger than that of Fig. 1. Fig. 3 is a detail view, partly in section and partly in elevation, illustrating a portion of the speed-changing mechanism. Fig. 4 is a detail view in elevation of the shifting-lever shown in Fig. 3 with some of the adjacent and coöperating parts. Fig. 5 is a plan view of a portion of the controlling mechanism with parts in section on a horizontal plane. Fig. 6 is a detail view of some of the parts shown in Fig. 5 in section on a horizontal plane and on a larger scale. Fig. 7 is a section on the line 7 7 of Fig. 6. Fig. 8 shows detail views in outline of a portion of the gearing.

In the drawings the members of a vehicle-frame to which the improvements are represented as applied are for the purposes of explanation sufficiently indicated at $A^3$, $B'$, $B^2$, $B^3$, and $C'$, the member $A^3$ in the construction shown being the rear vertical member of the frame, the parts $B'$ and $B^3$ being rear transverse members, and the part $C'$ being a brace or rearward extension which supports the seat for the rider or driver. The construction of the frame, however, is not material so far as the present invention is concerned, except as may be indicated in the claims hereinafter.

The rear or driving axle K of the vehicle is supported in suitable bearings, (indicated at K', ) which are mounted upon the frame of the vehicle and extend through from side to side, passing through the hubs of both wheels $K^2$ $K^3$. One wheel, as $K^2$ in the construction shown, is secured directly to the shaft or axle K. The other wheel, as $K^3$, is secured to a sleeve $K^4$, which is mounted on the shaft or axle K to rotate independently thereon. Both wheels, however, might be secured to sleeves mounted on the axle. An internal shoulder on the sleeve and a nut and washer, as at $K^5$, prevent longitudinal movement of the sleeve upon the axle. In order that the two wheels may have a certain independence of movement, as when the vehicle is making a turn, they are coupled together through a balance-gear, which, so far as the rest of the invention is concerned, may be of any suitable construction, but preferably is arranged as represented in the drawings. As there shown, two pinions $K^6$ and $K^7$ are respectively secured to the axle K and the sleeve $K^4$ and are respectively engaged by two long pinions $K^8$ and $K^9$, which intermesh between the pinions $K^6$ and $K^7$. The pinions $K^8$ and $K^9$ are carried upon shafts $K^{10}$ and $K^{11}$, respectively, which are carried by two gear $K^{12}$ and $K^{13}$ of different pitch diameters in the arrangement shown, mounted to rotate freely on the shaft or axle K and the sleeve $K^4$ or an intermediate sleeve $k^4$. As the two gears rotate together and carry with them the long pinions $K^8$ and $K^9$, which mesh, as described, it is evident that the two gears or pinions $K^6$ and $K^7$ will be rotated and through them the two wheels $K^2$ and $K^3$, but that one wheel will be permitted to rotate faster than the other when turning a corner. It is a decided advantage to have the axle K run through from wheel to wheel, as it gives with a light axle the necessary strength and avoids the considerable size and weight which it would be necessary to give to the parts if the axle were divided, as is commonly the case in vehicles in which provision is made for independence of movement of the wheels in the manner referred to.

The gear $K^{13}$ is recessed to receive an internal brake-band L, which is anchored at one side of the axis to the surrounding and supporting casing and is split at a point diametrically opposite the anchor, the two parts being normally pulled together to keep the brake-band from contact with the flange of the gear $K^{13}$ by a spring L'. A cam-shaft $L^2$ rests between the ends of the brake-band and being properly supported in the casing is adapted to be rocked by any suitable means under the control of the rider or driver to spread the band and so apply the brake. As represented in the drawings, the shaft is connected by an arm $L^3$, link $L^4$, arm $L^5$, rock-shaft $L^6$, arm $L^7$, and link $L^8$ to one arm of a foot-lever $L^9$, a spring $L^{10}$ acting on the foot-lever to hold the brake off normally.

A counter-shaft M is mounted in suitable bearings in proximity to the axle K and carries loosely thereon two pinions M' and $M^2$, which mesh, respectively, with gears $K^{12}$ and $K^{13}$. Between the pinions, which are formed on their proximate faces with clutch-teeth, a sliding clutch member $M^3$ is mounted on the shaft M, so as to rotate therewith, its ends or faces being formed to engage the pinions M' and $M^2$, respectively. The said clutch member is engaged by a lever $M^4$, so that it can be shifted into engagement with either one of the pinions. This mechanism constitutes a gear-changing device of ordinary construction. The shaft M is driven in the arrangement shown by a gear $M^5$ and pinion $M^6$ from the shaft $M^7$, which is mounted in suitable bearings, the said shaft $M^7$ being coupled to the main driving-shaft, which is represented as in alinement therewith, through a clutch which is sufficiently indicated at $M^8$ and may be of any suitable form, although it is preferably some form of friction-clutch. The clutch is operated by devices hereinafter described.

The main driving-shaft N, above referred to, is mounted in suitable bearings and is arranged to be driven by the motor, which is sufficiently represented at N', its particular character not being material, although it is assumed in the present instance to be an explosive-engine which requires to be turned over one or more times in starting up. The said shaft N is also arranged to be rotated by the rider or driver in starting up the motor, at which time the clutch $M^8$ is open, so that the strength of the driver may not be taxed to propel the vehicle at the same time that it is employed in starting the motor. Furthermore, as will be described hereinafter, the manual driving mechanism or mechanism actuated by the rider or driver (it being understood that the term "manual" is employed with a meaning sufficiently broad to include any form of mechanism actuated directly by the rider or driver) is so arranged and related to and connected with the rear axle of the vehicle that the rider or driver can apply his entire strength to the rear axle in the propulsion of the vehicle without wasting it at the same time in turning over the motor or keeping in motion the speed-changing mechanism and its connections. In a suitable bearing (indicated at O) is rotatably mounted a sleeve O', to which motion is imparted from the manual driving mechanism (represented by the crank-shaft $C^2$) by any suitable transmission means—such as a chain and sprocket wheels, as represented. The sleeve O' surrounds the shaft N, but is entirely clear thereof, so that none of the power of the driver of the motor is wasted in overcoming friction between the sleeve and the shaft. The sleeve is adapted to be coupled either to the shaft N or to the rear axle K, it being arranged for this purpose to slide longitudinally to a limited extent within its bearing and having at one end, as at $O^2$, clutch-teeth to engage a clutch member $O^3$, which is fixed to the shaft N, and having a flange $O^4$ with clutch-teeth on its inner face to engage a sprocket-wheel $O^5$, which is mounted on the end of the bearing O and is connected to the rear axle K by a chain and sprocket wheel $O^6$ $O^7$ or by any other convenient means. A spring $O^8$ serves to maintain the sleeve $O'$ normally in engagement with the gear or sprocket wheel $O^5$, so that except when the connections are changed by the rider or driver the manual driving mechanism is in connection with the rear or driving axle of the vehicle. The tension of the spring $O^8$ is overcome when necessary by means under control of the rider or driver and which will be described presently. The ratchet or other suitable clutch between the manual driving mechanism and the axle permits the rider to drive the vehicle or assist in driving when necessary, but permits him to discontinue the operation of the manual driving mechanism whenever he desires.

It is obvious that there are several different changes in the driving mechanism to be effected, according to the desire of the rider or driver, and the controlling devices or devices for effecting these changes have all been arranged so that they can be conveniently manipulated by the rider or driver without requiring him to remove both hands from the handle-bar. A tubular shaft P is mounted in suitable bearings in a position convenient to the hand of the rider or driver and is provided at its upper end with a handle $P'$. At its lower end it has a short arm $P^2$, connected with a link $P^3$, the free end of which slides in a suitable guide. An arm $P^4$ is fixed to the link in position to bear against the end of the sleeve $O'$, so that by giving a partial turn to the shaft P the sleeve $O'$ is shifted so as to disengage the manual driving mechanism from the driving-axle and couple it to the main driving-shaft F to permit the shaft of the motor to be turned over. Within the shaft P is supported a shaft R, also provided at its upper end with a handle $R'$. At its lower end it carries a cam-disk $R^2$, which has formed therein a cam-groove $R^3$. In a suitable guide are mounted two slides $R^4$ and $R^5$, each of which has a pin entering the cam-groove. The slide $R^4$ engages the clutch-lever $M^4$ of the gear-changing mechanism and the slide $R^5$ engages the movable part of the clutch $M^8$. A spring-detent $R^6$ coöperates with the notched periphery of the cam-disk in such a manner as to enable the rider or driver to bring the cam-disk to rest in one of the predetermined positions.

In the positions of the parts represented in the drawings the manual driving mechanism, as previously stated, is coupled to the driving-axle of the vehicle. The clutch $M^8$ is open, so that the main driving-shaft is disconnected from the speed-changing mechanism, and the movable clutch member of the speed-changing mechanism occupies a middle position between the two pinions, not being in engagement with either. A movement of the handle $P'$ effects the uncoupling of the manual driving mechanism from the driving-axle and couples it to the main driving-shaft of the motor, so that the rider or driver can start up the motor. When the motor has been started, the handle $P'$ is released, and the manual driving mechanism is thereupon uncoupled from the main driving-shaft. The operation of the motor, however, has no effect upon the vehicle until the handle $R'$ is turned in one direction or the other, according to the gear desired. The first effect of the movement of the handle $R'$ in either direction is to cause the clutch member $M^3$ to couple one of the pinions $M'$ $M^2$ to the shaft M before the latter begins its movement, thereby preventing the breaking of the clutch-teeth or other parts. The continued movement of the handle $R'$ in either direction gradually closes the clutch $M^8$ between the shaft $M^7$ and the shaft N, thereby coupling the motor to the driving-axle gradually. It will be observed that in changing the gear of the vehicle when it is in motion the connection between the motor and the driving mechanism is broken before the change of connection of the movable clutch member of the gear-changing mechanism is effected.

When the motor is coupled to the driving-axle, the manual driving mechanism can be coupled thereto also, thus permitting the driver or rider to augment the power of the motor when necessary.

It will be evident that the details of construction and arrangement may be varied according to the necessities of each particular case and that the invention is not to be limited to the precise construction and arrangement of parts shown and described herein.

We claim as our invention—

1. In a vehicle, the combination of a driving wheel or axle, a motor, manual driving mechanism, connections from the driving-shaft of the motor to said driving wheel or axle, independent connections from said manual driving mechanism to said driving wheel or axle, and means to couple said independent connections to the driving-shaft of the motor.

2. In a vehicle, the combination of a driving wheel or axle, a motor, manual driving mechanism, connections from the driving-shaft of the motor to said driving wheel or axle, independent connections from said manual driving mechanism to said driving wheel or axle, means to couple said independent connections to the driving-shaft of the motor, and means to uncouple said independent connections from said driving wheel or axle.

3. In a vehicle, the combination of a driving wheel or axle, a motor, manual driving mechanism, connections from the driving-shaft of the motor to said driving wheel or axle, a clutch between said driving-shaft and said connections, connections from said manual driving mechanism to said driving-shaft, and a clutch between said last-named connections and said driving-shaft.

4. In a vehicle, the combination of a driving wheel or axle, a motor, manual driving mechanism, connections from the driving-shaft of the motor to said driving wheel or axle, a clutch between said driving-shaft and said driving-wheel and connections, independent connections from said manual driving mechanism to said driving wheel or axle, a clutch included in said independent connections, and means to couple said independent connections to the driving-shaft of the motor.

5. In a vehicle, the combination of a driving wheel or axle, a motor, a sleeve surrounding the driving-shaft of said motor, connections from the driving-shaft of the motor to said driving wheel or axle, independent connections, including a clutch, from said sleeve to said driving wheel or axle, means to couple said sleeve to the driving-shaft of the motor and manual driving mechanism connected to said sleeve.

6. In a vehicle, the combination of a driving wheel or axle, a motor, connections from the driving-shaft of the motor to said driving wheel or axle, a clutch between said driving-shaft and said connections, a sleeve surrounding said driving-shaft, independent connections from said sleeve to said driving wheel or axle, means to couple said sleeve to the driving-shaft of the motor and manual driving mechanism connected to said sleeve.

7. In a vehicle, the combination of a driving wheel or axle, a motor, connections from the driving-shaft of the motor to said driving wheel or axle, a sleeve surrounding said driving-shaft, a bearing for said sleeve in which the same is movable longitudinally, a gear mounted upon said bearing and having clutch-teeth to engage said sleeve, a clutch member fixed upon the driving-shaft of the motor to engage said sleeve, connections from said gear to said driving shaft or axle and manual driving mechanism connected to said sleeve.

8. The combination with a vehicle-frame comprising side bars and vertical rear members, of a driving axle or wheel, bearings for the same located beyond or outside of said vertical members, a motor supported beyond said vertical members, connections from said motor to said driving wheel or axle, a manual driving mechanism supported beyond said vertical members and connections from said driving mechanism to said driving wheel or axle, whereby all of said parts are accessible from the end of the vehicle.

9. The combination with a vehicle-frame comprising side bars and vertical rear members, of a driving wheel or axle, bearings for the same located beyond said vertical members, a motor supported beyond said vertical members, connections from said motor to said driving wheel or axle, a manual driving mechanism supported beyond said vertical members, connections including a clutch from said driving mechanism to said driving wheel or axle, and means under control of the rider or driver for opening and closing said clutch also located beyond said vertical members.

10. The combination with a vehicle-frame comprising side bars and vertical rear members, of a driving wheel or axle, bearings for the same located beyond said vertical members, a motor supported beyond said vertical members, connections from said motor to said driving wheel or axle including a gear-changing device, means for controlling said speed-changing device located beyond said vertical members, a manual driving mechanism supported beyond said vertical members and connections from said driving mechanism to said driving wheel or axle.

11. In a vehicle, the combination of a driving wheel or axle, a motor, connections from said motor to said driving wheel or axle including a clutch and a gear-changing device, a single lever or handle under control of the rider or driver, and operative connections between said lever or handle and said clutch and said gear-changing device, whereby with a single continuous movement the rider or driver can open said clutch, effect the change of the gear, and close said clutch.

12. In a vehicle, the combination of a driving wheel or axle, a motor, connections from said motor to said driving wheel or axle including a clutch and a gear-changing device, a single cam-disk under control of the driver or rider, and operative connections between said cam-disk and said clutch and said gear-changing device.

13. In a vehicle, the combination of a driving wheel or axle, a motor, connections from said motor to said driving wheel or axle including a clutch and a gear-changing device, a slide connected to the movable member of said clutch, a second slide connected to said gear-changing device and a single cam-disk engaging both of said slides and under control of the driver or rider.

This specification signed and witnessed this 28th day of June, A. D. 1898.

HIRAM PERCY MAXIM.
  HARRY M. POPE.
  H. W. ALDEN.

In presence of—
 H. E. HART,
 W. B. GREELEY.